(12) United States Patent
Maier

(10) Patent No.: US 7,399,001 B2
(45) Date of Patent: Jul. 15, 2008

(54) ROTARY FLUID-FEED COUPLING WITH TEMPERATURE COMPENSATION

(75) Inventor: Erich Maier, Heidenheim (DE)

(73) Assignee: Christian Maier GmbH & Co. Maschinenfabrik, Heidenheim (DE)

( * ) Notice: Subject to any disclaimer, the term of this patent is extended or adjusted under 35 U.S.C. 154(b) by 324 days.

(21) Appl. No.: 10/537,328

(22) PCT Filed: Dec. 4, 2003

(86) PCT No.: PCT/DE03/04011

§ 371 (c)(1), (2), (4) Date: Jun. 1, 2005

(87) PCT Pub. No.: WO2004/051130

PCT Pub. Date: Jun. 17, 2004

(65) Prior Publication Data

US 2006/0017283 A1   Jan. 26, 2006

(30) Foreign Application Priority Data

Dec. 4, 2002   (DE) ............................... 102 56 537

(51) Int. Cl.
*F16L 27/00* (2006.01)
*F16L 39/04* (2006.01)

(52) U.S. Cl. .............. 285/121.4; 285/121.1; 285/121.3; 285/121.6

(58) Field of Classification Search .............. 285/121.1, 285/121.2, 121.3, 121.4, 121.5, 121.6, 98, 285/279, 280, 281

See application file for complete search history.

(56) References Cited

U.S. PATENT DOCUMENTS

| 2,805,087 | A | * | 9/1957 | Shaw et al. ............... 285/121.4 |
| 3,002,769 | A | * | 10/1961 | Deubler et al. ................ 285/39 |
| 3,061,337 | A | * | 10/1962 | Shaw et al. ............... 285/121.4 |
| 3,273,592 | A | * | 9/1966 | Deubler et al. ......... 137/624.13 |
| 3,889,983 | A | * | 6/1975 | Freize et al. ................... 285/13 |
| 4,355,827 | A |   | 10/1982 | Ehret |
| 4,817,995 | A | * | 4/1989 | Deubler et al. ................ 285/98 |
| 4,976,282 | A | * | 12/1990 | Kubala ....................... 137/580 |
| 5,169,181 | A |   | 12/1992 | Timm et al. |
| 5,174,614 | A | * | 12/1992 | Kaleniecki .................. 285/279 |
| 5,538,292 | A | * | 7/1996 | Sommer ...................... 285/13 |
| 5,617,879 | A | * | 4/1997 | Kubala ....................... 285/95 |
| 5,669,636 | A | * | 9/1997 | Kubala ....................... 285/98 |
| 6,412,822 | B1 | * | 7/2002 | Omiya et al. ............ 285/121.3 |

FOREIGN PATENT DOCUMENTS

DE            42 03 954          6/1993

* cited by examiner

*Primary Examiner*—James M. Hewitt
(74) *Attorney, Agent, or Firm*—Andrew Wilford

(57) ABSTRACT

A rotary coupling has a nonrotatable stator having a stator passage with an end opening along an axis and a rotor rotatable on the stator about the axis and having a rotor passage with an end axially confronting the stator end. A rotor seal is rotatable with the rotor end about the axis, and a stator seal is rotationally fixed to the stator end and bears axially on the rotor seal. Thus the rotor seal rotates on the stator seal on rotation of the rotor. A strain element that changes size in response to temperature in the stator adjacent the seals is coupled to one of the seals for shifting the one seal relative to the other seal in response to temperature changes adjacent the seals.

16 Claims, 4 Drawing Sheets

ROTARY FLUID-FEED COUPLING WITH TEMPERATURE COMPENSATION

CROSS REFERENCE TO RELATED APPLICATIONS

This application is the US national phase of PCT application PCT/DE2003/004011, filed 4 Dec. 2003, published 17 Jun. 2004 as WO 2004/051130, and claiming the priority of German patent application 10256537.6 itself filed 4 Dec. 2002, whose entire disclosures are herewith incorporated by reference.

FIELD OF THE INVENTION

The invention relates to an apparatus or device for feeding a gaseous and/or liquid medium to a rotating pressurized system, provided with a stationary seal-head housing with a connection port for the medium to which a connection passage extending into the seal-head housing is connected, as well as with a tubular rotor connected with the pressurized system and also extending into the sealhead housing, and furthermore with a stator seal at an end of the connection passage and a rotor seal on an end of the rotor, the stator seal and the rotor seal being coaxial to the rotor and engaging each other.

An apparatus of this type serves for example as a seal head or rotary feed coupling to transmit a fluid from stationary to rotary machine elements and/or vice versa. As a result of technical advances the requirements for rotary feedthroughs are increasing regularly. In particular shop machines with spindle rotation speeds have increased in the last decade from about 4000 to 6000 RPM to 20,000 to 50,000 RPM. In addition the pressures of the media are steadily increasing. With minimal lubrication plus new applications, e.g. bowing off chips with compressed air when machining graphite, in order to get the medium to the tool it is necessary to meet extreme requirements in particular with respect to the seals.

Particularly critical with the increased demands on the service life of rotary couplings are leaks that can occur in the bearing or in the spindle and which blow out the seals, for example when they are pressurized but there is no actual flow.

In addition it cannot happen that as a result of standard use the service life of the known rotary feed couplings is reduced.

More specifically, the following factors have been found to have a particularly great influence on the pressure stress in a seal:

the pressure of the medium and the pressure on the seal surfaces;
  the type of medium and how it lubricates;
  the rotary speed and the diameter or frictional speed; and
  the throughflow speed and type of the medium and how it is cooled.

All these factors directly affect the generation of heat in the seal. Low temperatures are associated with low stress, high temperatures with high stress of the seal. Thus operating temperature is a significant factor affecting control of the pressure stress on the seal. It is said in control technology that temperature is the leading factor.

German 4,203,954 describes a rotary coupling where the rotor is axially positioned relative to the stator either manually or by means of a bimetallic element in dependence on temperature. The disadvantage of this solution is the substantial dependence of the adjustment movement and the adjustment action on the pressure and the setting force. In addition all the stresses on the seal vary independently of the respective loads.

OBJECT OF THE INVENTION

It is an object the invention to provide an apparatus of the above-described type in the form of a rotary feedthrough coupling that has a long service life even when used in different application and that also is uniquely set up that independent of operating conditions, medium, and outside circumstances it works surely and is guaranteed to have a long service life. It is significant that the seal and bearing load be reduced so as to minimize any leakage.

SUMMARY OF THE INVENTION

This object is solved according to the invention in that near the stator and rotor seals there is a thermally influenced strain element that shifts the stator and rotor seals toward and/or away from each other in accordance with temperature.

The advantage of the instant invention is that the control reaction is very fast. On the one hand there is very fine control as a result of the longitudinal movement. On the other hand large forces resulting from the length change have a considerable influence on the control reaction, independently of the pressure of the medium. Advantageously in addition there is the nearly unlimited and friction-free reproducibility of the thermally actuated length change.

In a preferred embodiment of the invention the strain element is formed as a sleeve that has an end turned toward the pressurized system and fixed on the seal-head housing and an opposite end turned toward the stator seal and bearing against a coupling ring connected with the stator seal. Since the strain element completely surrounds the exact place where temperature is most critical, any temperature increase is immediately converted into an adjustment action and a reduction of stress on the seals.

In order to further increase the sensitivity of the arrangement, the strain element has at least on its inner surface a heat-absorbing surface coating and/or surface increasing structure.

To ensure that the arrangement is as free of play as possible it is further proposed that the coupling ring be urged by a spring against the strain element.

A further advantageous embodiment of the invention is that the coupling ring surrounds an axially shiftable seal support carrying the stator seal and a stator spring presses it and the stator seal on the axially fixed rotor seal. In addition it is preferred that the seal support have an annular rim projecting radially toward the coupling ring.

In a particularly advantageous embodiment according to the invention, the coupling ring is made of a material with a low coefficient of thermal expansion and the seal support of a material with a greater coefficient of thermal expansion and that at normal operating temperature there is a narrow annular gap between the coupling ring and the seal support. in this manner the stator seal during normal operation is pressed by the stator spring against the rotor seal. Only when a certain temperature threshold is passed is there friction between the coupling ring and the seal support, so that the strain element can be effective via the coupling ring and the seal support on the stator seal to relieve pressure at the seal faces without however creating a gap, which is not wanted so that particles cannot get in and create wear.

Furthermore it is preferred for heat-transfer reasons that the annular rim of the seal support be conically tapered at its end toward the stator seal.

In order to prevent an unwanted actuation of the control mechanism, that is to prevent the pressure of the medium and the forces created by it from acting on the rotor and stator seals, the outer diameter of the part of the seal support set in the seal-head housing is the same as the diameter of the rotor bore holding the rotor and the bore diameter of the rotor seal and the stator seal are the same. Thus these axially effective forces cancel each other out.

In order that the rotor seal does not move with the stator seal when it is being drawn back for control purposes, a spring presses the rotor seal axially against a rim.

It has further proven advantageous when flanking the bearing there are seal gaps each with a respective annular passage to which a blocking medium, e.g. compressed air, is supplied and that have at least a partial connection to a leak fitting.

A further preferred embodiment of the invention is characterized in that between the strain element and the movably mounted seal support there is a rotary thermally actuatable coupling.

Preferably the coupling is formed by two relatively rotatable coupling disks of which at least one is formed as a wedge disk with an angularly extending wedge face. For relative rotation a spiral-shaped bimetallic element is secured at an end to one of the coupling disks.

At normal or room temperature the coupling disks are so positioned relative to each other that together they are of shortest possible axial length. A first coupling disk is connected to and rotatable by the strain element and the second coupling disk is engaged by the first. The bimetallic element that is connected to the second coupling disk, has rotated this into a position in which the coupling is of minimal length and there no contact between the second coupling disk and the axially movable seal ring or its support.

If the temperature of the bimetallic element located right at the seal joint increases, for example because of friction, the second coupling disk is pivoted on the wedge faces until there is actual contact with the axially movable seal or its support. When the flank angle is small there is a self-locking action even when high axial pressures are being transmitted and no further rotation is possible. The longitudinal expansion of the strain element is effective directly to change the position or reduce the pressure in the seal.

According to a further embodiment of the invention a stress-relief ring is provided between the coupling ring and the seal support.

To this end the coupling ring is made of a material of low coefficient of thermal expansion and the stress-relief ring of a material of higher coefficient of thermal expansion and at normal operating temperature there is a small annular gap between the coupling ring and the stress-relief ring.

Further according to the invention a specially shaped annular rim of the stress-relief ring is continuously pressed endwise by springs against the seal support and heat is conducted by metal-to-metal contact between the seal support and the stress-relief ring.

The stress-relief ring presses lightly at all times against the seal support. The temperature-dependent adjustment of the stator and rotor seals is thus only effective when as a result of heat build up between the stress-relief ring and the coupling ring the radial gap is eliminated so that friction is created and the length of the strain sleeve changes. The difference between this and the previously described solution is that the surfaces effective for coupling and coupling are done are different. In the previously describe embodiment coupling and stress relief are on the contrary done by the adjacent surfaces of the coupling ring and seal support.

This modified embodiment has on the other hand a coupling between the coupling ring and the stress-relief ring and stress relief is effected between the seal support and the annular rim of the stress-relief ring. This makes possible better movability of the seal support and thus better operational performance of the seal.

BRIEF DESCRIPTION OF THE DRAWING

In the following the invention is described more closely with reference to an embodiment shown in the drawing. Therein.

SPECIFIC DESCRIPTION

Figure 1:
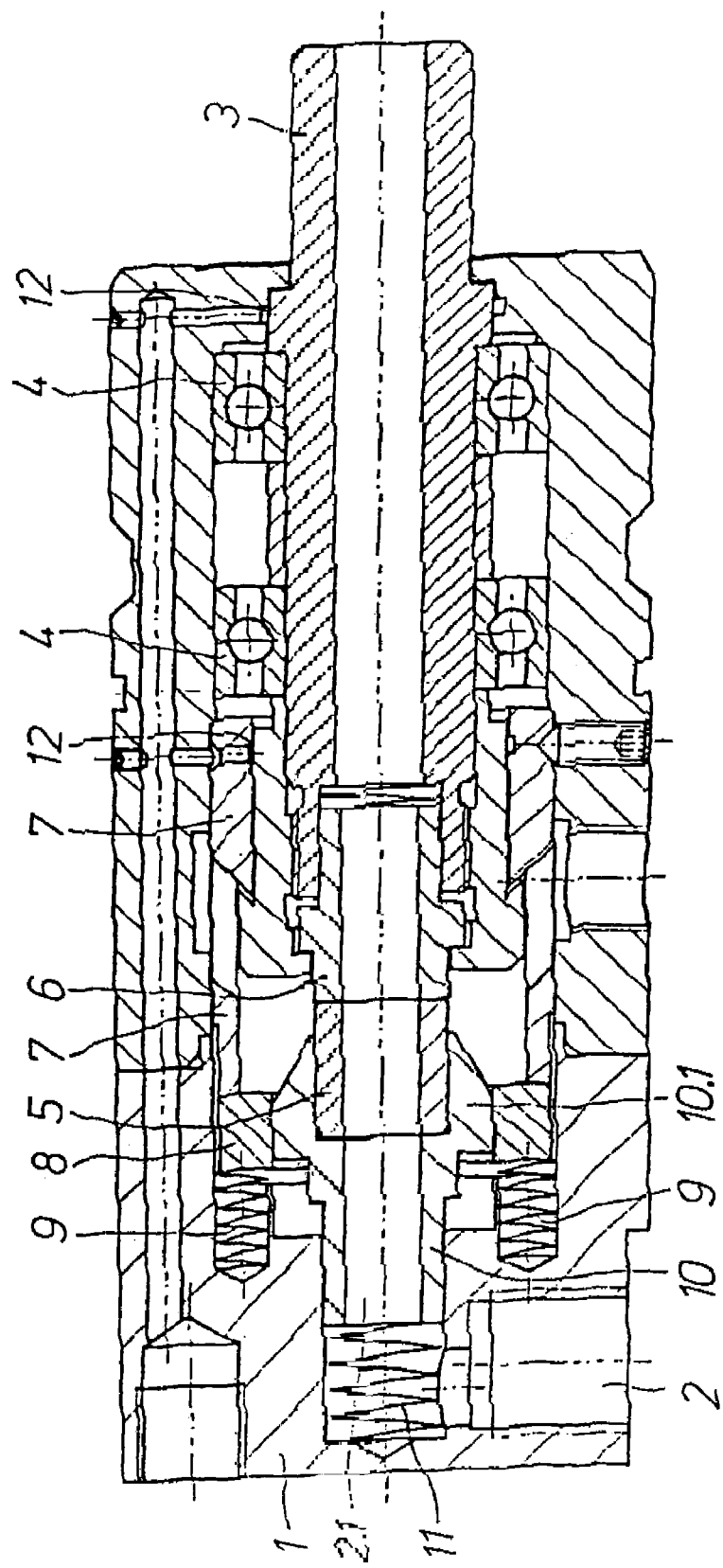
FIG. 1 is a section through the apparatus according to the invention.
Figure 2:
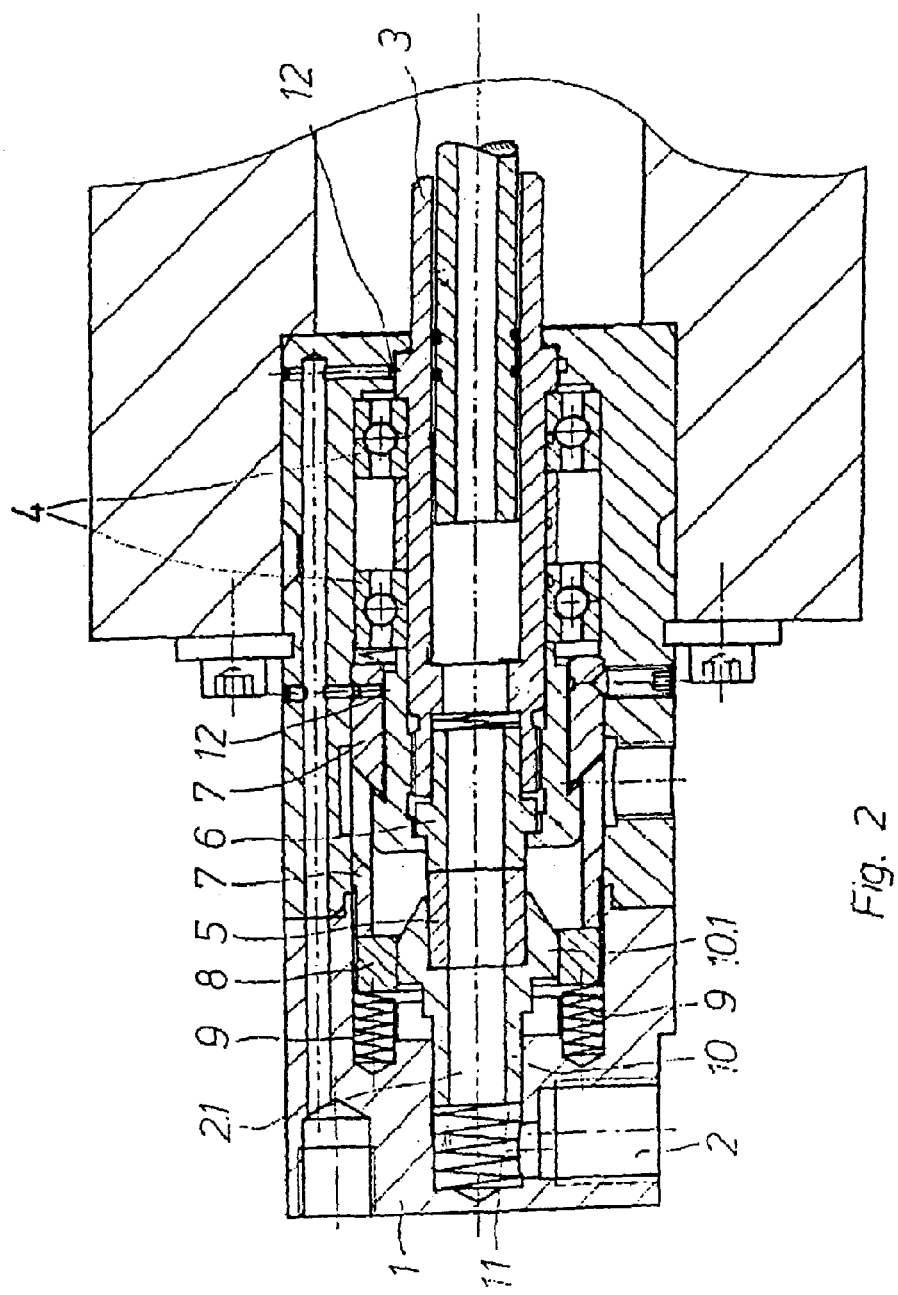
FIG. 2 shows the apparatus of FIG. 1 built into the stator of a machine spindle.

The apparatus shown in the drawing serves for conducting a gaseous and/or liquid medium to a rotating pressurized system. It basically comprises a stationary seal-head housing 1 with a connection port 2 for the medium opening into a connection passage 2.1 extending inside the seal-head housing 1. In addition it also has inside the seal-head housing 1 and connected with the pressurized system a tubular rotor 3 that is journaled via two roller bearings 4 on the stationary seal-head housing 1.

At the end of the connection passage 2.1 there is a stator seal 5 while the end of the rotor 3 has a rotor seal 6, the stator seal 5 and rotor seal 6 being coaxial with the rotor 3 and bearing on each other at end faces. The end faces can, as in the embodiment, be planar or have a conical or other shape.

Near the stator and rotor seals 5 and 6 there is a thermally adjustable strain element 7 that directly axially effects a temperature-dependent shifting of the relative axial positions of the stator and rotor seals 5 and 6. This shifting is done such that when the temperature around the seals 5 and 6 increases so as to increase wear, this is countered by a slight increasing of their relative spacing without however actually separating the two seals 5 and 6 from each other. This shifting is in practice in the micrometer range.

The strain element 7 is to this end formed as a sleeve that is fixed at its end turned toward the pressurized system on the seal-head housing 1. The end of the element 7 turned toward the stator seal 5 on the other hand is connected to a coupling ring 8 connected with the stator seal 5. With this type of connection the entire length of the strain element 7 is available for a thermally caused length change and thus the shifting of the seals 5 and 6.

The strain element 7 can also be provided at least on its inner surface with a coating to absorb heat radiation, so that it heats more quickly and provides a faster-acting control mechanism.

The coupling ring 8 is pressed without play by a spring 9 against the strain element 7. Furthermore the coupling ring 8 surrounds an axially shiftable seal support 10 in whose end the stator seal 5 is seated, and a stator spring 11 presses this stator seal 5 against the axially fixed rotor seal 6.

The seal support 10 is also formed with an annular rim 10.1 projecting radially toward the coupling ring 8, the coupling ring 8 and the seal support 10 being constructed such that at regular operating temperature there is a small annular gap between them.

The coupling ring 8 is formed of a material having a low coefficient of thermal expansion while the seal support 10 is made of a material with a greater coefficient of thermal expansion. Thus in the event of heating, the seal support 10 will expand radially and decrease the annular gap until there is actual frictional coupling between the seal support 10 and the coupling ring 8. Starting at this time the seal support 10 is entrained by the coupling ring 8 for joint longitudinal movement as it is shifted by the strain element 7 so that the stator seal is pulled slightly away from the rotor seal 6, while however no actual space is created between the two seals 5 and 6. This ensures that no particles that could wear the seals 5 and 6 can get between the rotor and stator seals 5 and 6.

When subsequently the temperature drops, the strain element 7 shortens and the frictional coupling between the seal support 10 and the coupling ring 8 is lost. When heated up again, the control mechanism responds again in the described manner.

In order also to prevent hydraulic forces that come from the heat-exchange medium from acting on the seals 5 and 6, the outer diameter of the part of the seal support 10 engaged in the seal-head housing 1 is the same as the diameter of the rotor bore holding the rotor 3. In addition the bore diameters of the rotor seal 6 and the stator seal 5 are the same. This prevents that, for example as a result of pressure variations, addition forces effective on the actual control mechanism have an influence on the seals 5 and 6.

Finally, flanking the two seals 4 there are seal gaps 12 with annular passages through which a blocking medium such as, for example, compressed air is supplied and which at least partially are connected to a leak connection.

Figure 3:
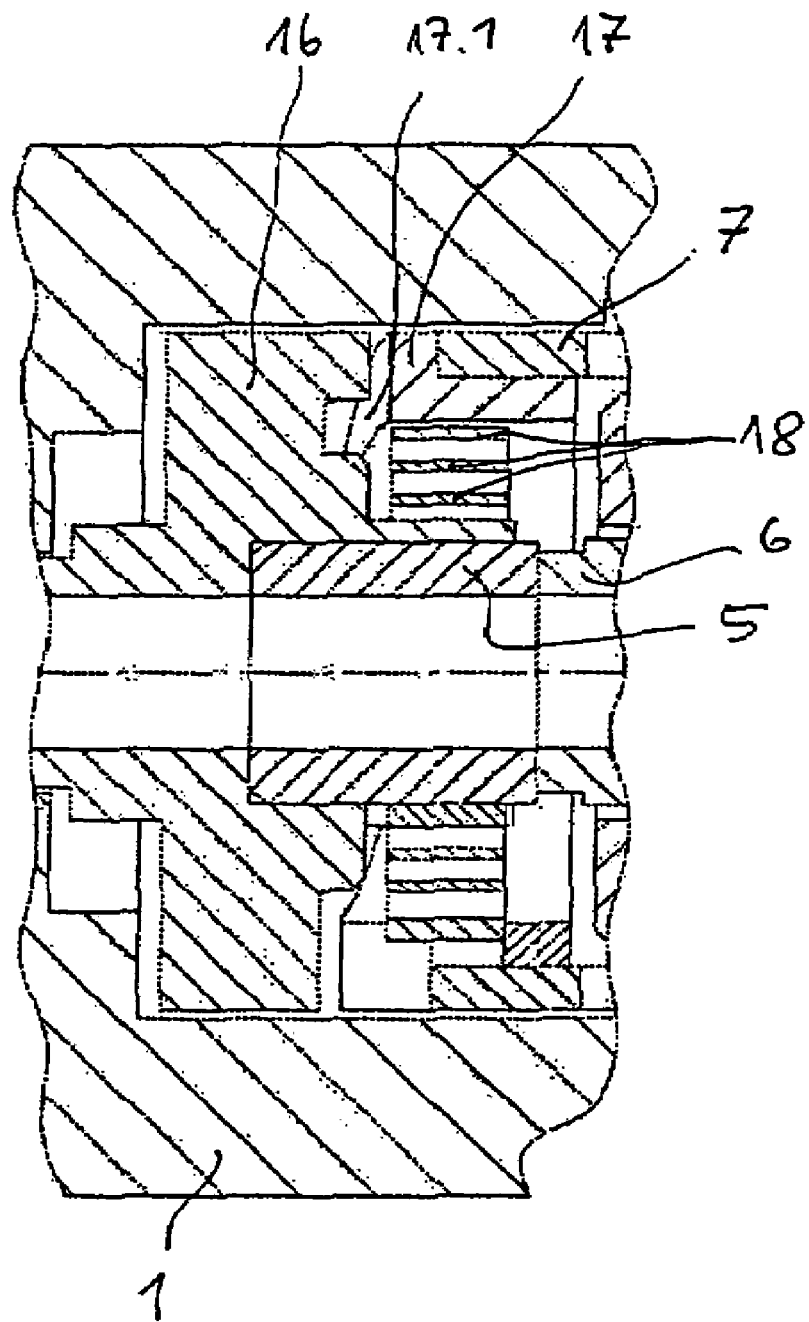
FIG. 3 is a variant on the structure of FIG. 1, shown only partially.

FIG. 3 shows a further embodiment of the invention where between the strain element and the movable seal support 10 there is a rotationally effective and thermally actuated coupling. The coupling is formed by two rotatably relatively movable coupling disks 16 and 17 of which one is formed as a wedge disk with peripheral angled wedge faces 17.1. The second coupling disk 17 has axially projecting bumps not visible in the drawing that engage the wedge faces 17.1. The coupling disks 16 and 17 are rotated by a spiral-shaped bimetallic element 18 connected at an end of one of the coupling disks.

At rest or room temperature the coupling disks 16 and 17 are relatively so oriented that they are of minimal axial length. The one coupling disk 17 engages the strain element 7 and is rotatable. The bimetallic element 18 at room temperature holds the second coupling disk 17 in a position in which the coupling is of minimal length and there is no contact between the second coupling disk and the axially movable seal or the seal support 10.

When the temperature increases right at the bimetallic element 18 in the seal space, for example as a result of friction, the coupling disk 17 is rotated so far on the wedge faces until it contacts the axially shiftable seal or its seal support 10. As a result of a limited wedge angle for self-locking action even with a great axial load there is no further rotational position change. The longitudinal shifting of the strain element 7 is now effective on positioning and reducing forces in the seal.

Figure 4:
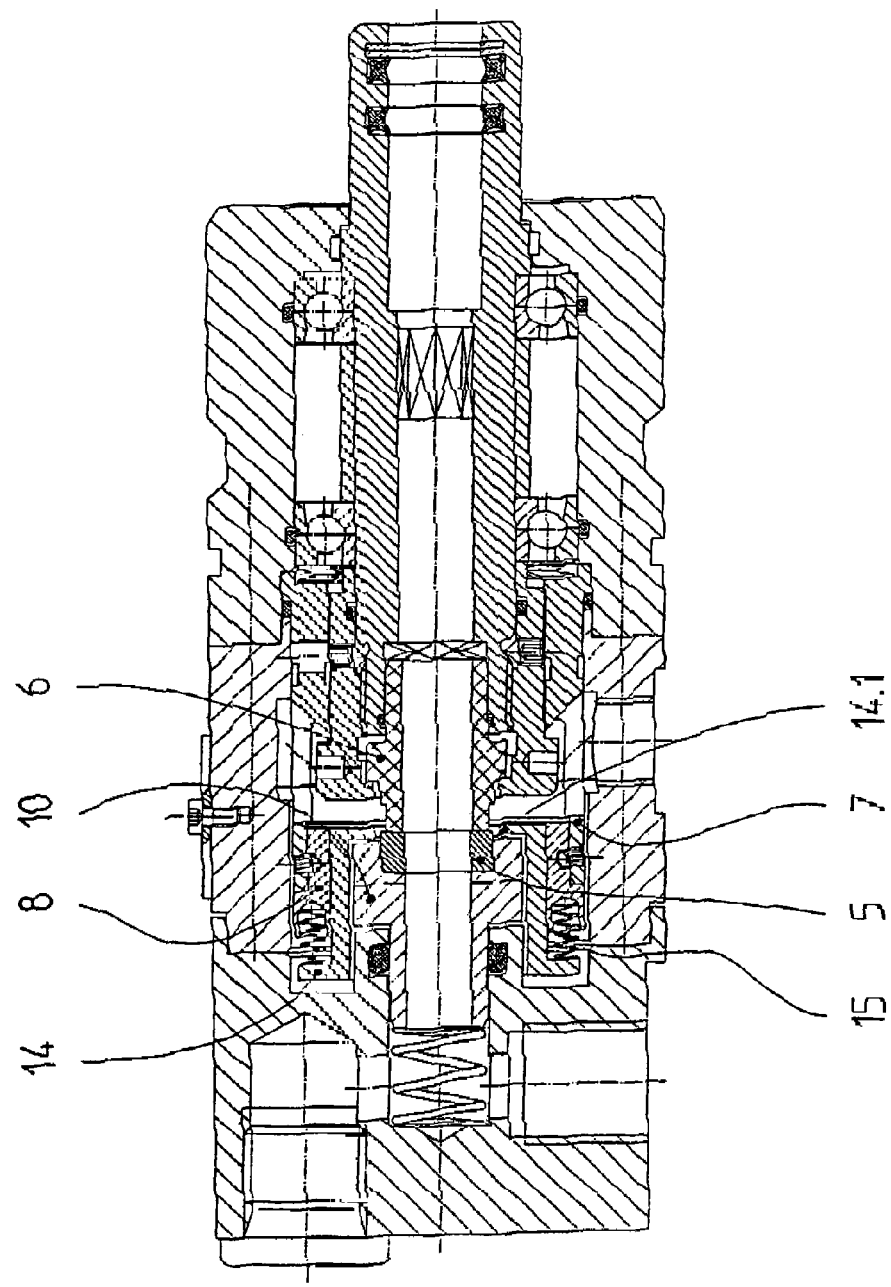
FIG. 4 is a further embodiment of the FIG. 1 structure.

In the embodiment shown in FIG. 4 there is between the coupling ring and the seal support 10 a stress-relief ring 14. To this end the coupling ring 8 is made of a material with a low coefficient of thermal expansion and the stress-relief ring 14 of a material with a substantially larger coefficient of thermal expansion, and at normal temperature there is between the coupling ring 8 and the stress-relief ring 14 a narrow annular gap.

The stress-relief ring 14 bears at all times by means of a spring 15 on an end of the seal support 10 via a specially shaped annular rim 14.1, and as a result of metal-to-metal contact and conduction the heat of the seal support 10 is transmitted to the stress-relief ring 14.

The stress-relief ring 14 bears lightly at all times on the seal support 10. The temperature-dependent stress relief between the stator and rotor seals is only effective when as a result of heating the radial gap is eliminated between the stress-relief ring 14 and the coupling ring 8, so that there is a frictional connection and also a length change of the strain sleeve 7. The difference from the other above-described solutions is that there is a separation between the surfaces effective for coupling and relieving stress. In the already described solution the coupling and stress relief are done via the adjacent faces of the coupling ring 8 and seal support 10.

This modified embodiment however couples the coupling ring 8 and the stress relief ring 14. Stress relief is effected between the seal support 10 and the annular rim 14.1 of the stress-relief ring 14. This facilitates easier movement of the seal support 10 and a more reliable operation of the seal.

The invention claimed is:

1. A rotary coupling comprising:
   a nonrotatable stator having a stator passage with an end opening along an axis;
   a rotor rotatable on the stator about the axis and having a rotor passage with an end axially confronting the stator end;
   a rotor seal on and rotatable with the rotor end about the axis;
   a stator seal on and rotationally fixed to the stator end and bearing axially on the rotor seal, whereby the rotor seal rotates on the stator seal on rotation of the rotor;
   a strain element that changes size in response to temperature in the stator adjacent the seals; and
   means coupling the strain element to one of the seals for shifting the one seal relative to the other seal in response to temperature changes adjacent the seals.

2. The coupling defined in claim 1 wherein the one seal is shifted away from the other seal on an increase of temperature adjacent the seals.

3. The coupling defined in claim 1 wherein the strain element is a sleeve generally coaxially surrounding the seals and having one end fixed axially to the stator and an opposite end operatively axially engaging the stator seal via the coupling means.

4. The coupling defined in claim 3 wherein the coupling means includes a coupling ring fixed axially between the opposite end of the sleeve and the stator seal.

5. The coupling defined in claim 4, further comprising a spring pressing the coupling ring axially against the strain element.

6. The coupling defined in claim 4 wherein the coupling means further comprises
   a seal support holding the stator seal and engaged between the stator seal and the coupling ring; and
   a stator spring pressing the seal support and stator seal axially toward the rotor seal.

7. The coupling defined in claim 6 wherein the seal support has a portion surrounded by the coupling ring and at a predetermined temperature spaced by a radial gap from the coupling ring, the coupling ring being of a material with a lower coefficient of friction than the portion of the seal support such that when heated above the predetermined temperature the stator support expands and closes the radial gap and couples the seal support with the coupling ring.

8. The coupling defined in claim 6 wherein the seal support has an end tapered toward the rotor seal.

9. The coupling defined in claim 6 wherein the stator has centered on the axis a bore in which a portion of the seal support slides and a bore in which the rotor turns, both bores being of substantially the same diameter.

10. The coupling defined in claim 3 wherein the sleeve has an inner surface provided with a heat-absorbing coating.

11. The coupling defined in claim 1, further comprising
  a bearing supporting the rotor in the stator, the stator being formed with inwardly open grooves flanking the bearing; and
  means for supplying a fluid under pressure to the grooves.

12. The coupling defined in claim 1 wherein the coupling means includes
  a temperature-sensitive element for connecting the strain element with the stator seal only when a temperature at the seals exceeds a predetermined threshold temperature.

13. The coupling defined in claim 12 wherein the temperature-sensitive element is spiral-shaped and bimetallic and has one end connected to the stator and an opposite end, whereby the bimetallic-element ends shift angularly relative to each other as a temperature of the bimetallic element changes, the coupling means further comprising
  a pair of disks one of which is connected to the opposite end of the bimetallic element and to the strain element and the other of which is connected axially to the stator seal; and
  formations between the pair of disks engageable with each other to axially couple the disks with each other on rotating of the one disk by the bimetallic element on temperature increase of the bimetallic element, whereby the disks are only coupled to each other to transmit movement from the strain element to the stator seal when the temperature of the bimetallic element exceeds a predetermined threshold temperature.

14. The coupling defined in claim 1 wherein the coupling means includes
  a coupling ring axially engaging the strain element; and
  a strain-relief ring surrounded by the coupling ring and at a predetermined temperature separated by a small radial gap from the coupling ring, the coupling ring being of a lower coefficient of thermal expansion than the coupling ring so that when a temperature of the strain-relief ring is above the predetermined temperature the strain-relief ring swells radially and frictionally engages the coupling ring, the strain-relief ring being axially operatively coupled to the stator seal.

15. The coupling defined in claim 14 wherein the stress-relief ring has a radially projecting rim axially operatively engaged with the stator seal.

16. The coupling defined in claim 14, further comprising
  spring means urging the stress-relief ring axially toward the strain element.

* * * * *